US010688772B2

(12) United States Patent
De Pena et al.

(10) Patent No.: US 10,688,772 B2
(45) Date of Patent: Jun. 23, 2020

(54) GENERATING THREE-DIMENSIONAL OBJECTS

(71) Applicant: Hewlett-Packard Development Company, L.P., Houston, TX (US)

(72) Inventors: Alejandro Manuel De Pena, Sant Cugat del Valles (ES); Pavel Kornilovich, Corvallis, OR (US); David H. Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 408 days.

(21) Appl. No.: 15/110,753

(22) PCT Filed: Mar. 31, 2014

(86) PCT No.: PCT/US2014/032328
§ 371 (c)(1),
(2) Date: Jul. 11, 2016

(87) PCT Pub. No.: WO2015/108550
PCT Pub. Date: Jul. 23, 2015

(65) Prior Publication Data
US 2016/0332380 A1 Nov. 17, 2016

(30) Foreign Application Priority Data

Jan. 16, 2014 (WO) ................. PCT/EP2014/050841

(51) Int. Cl.
B29C 67/00 (2017.01)
B33Y 50/02 (2015.01)
(Continued)

(52) U.S. Cl.
CPC .............. B33Y 50/02 (2014.12); B29C 64/00 (2017.08); B29C 64/165 (2017.08);
(Continued)

(58) Field of Classification Search
CPC . B29C 6464/165; B29C 64/165; B29C 64/40; B29C 64/386; B29C 64/00; B33Y 50/02; B33Y 30/00; B33Y 10/00
See application file for complete search history.

(56) References Cited

U.S. PATENT DOCUMENTS 5,182,056 A * 1/1993 Spence ................. G01J 1/4257
118/423
5,866,058 A 2/1999 Batchelder et al.
(Continued)

FOREIGN PATENT DOCUMENTS

GB 2422344 A 7/2006
JP 2006183146 7/2006

OTHER PUBLICATIONS

International Search Report and Written Opinion for International Application No. PCT/US2014/032328 dated Oct. 15, 2014, 10 pages.
(Continued)

Primary Examiner — Galen H Hauth
(74) Attorney, Agent, or Firm — HP Inc. Patent Department

(57) ABSTRACT

A three-dimensional object may be generated. Coalescing agent may be selectively delivered on a portion of a first layer of build material on a support member or previous layer. Energy may be applied to the first layer to cause the portion of the first layer to coalesce and solidify. A second layer of the build material may be provided on the first layer. While the second layer does not have coalescing agent delivered thereon, energy may be applied to the second layer such that energy may propagate through the second layer to the first layer to cause the portion of the first layer to coalesce and further solidify.

10 Claims, 6 Drawing Sheets

(51) Int. Cl.
  *B33Y 30/00* (2015.01)
  *B29C 64/40* (2017.01)
  *B29C 64/00* (2017.01)
  *B29C 64/165* (2017.01)
  *B29C 64/386* (2017.01)
  *B33Y 10/00* (2015.01)
  *B29K 105/00* (2006.01)

(52) U.S. Cl.
  CPC ............ *B29C 64/386* (2017.08); *B29C 64/40* (2017.08); *B33Y 10/00* (2014.12); *B33Y 30/00* (2014.12); *B29K 2105/251* (2013.01)

(56) References Cited

U.S. PATENT DOCUMENTS

| | | | |
|---|---|---|---|
| 6,169,605 B1 | 1/2001 | Penn et al. | |
| 6,363,606 B1 | 4/2002 | Johnson, Jr. et al. | |
| 6,376,148 B1 | 4/2002 | Liu et al. | |
| 6,896,839 B2* | 5/2005 | Kubo | B29C 64/153 264/109 |
| 8,021,139 B2 | 9/2011 | Kumagai et al. | |
| 2002/0020945 A1 | 2/2002 | Cho et al. | |
| 2005/0208168 A1 | 9/2005 | Hickerson et al. | |
| 2007/0238056 A1* | 10/2007 | Baumann | B33Y 10/00 430/325 |
| 2007/0241482 A1 | 10/2007 | Giller et al. | |
| 2012/0231175 A1 | 9/2012 | Tan | |
| 2015/0266239 A1* | 9/2015 | Okamoto | B29C 67/0081 428/413 |

OTHER PUBLICATIONS

Rajon, D. et al., An investigation of the potential of rapid prototyping technology for image-guided surgery, Jrnl. of Applied Clinical Medical Physics vol. 7 No. 4 (2006) 19pgs.

* cited by examiner

GENERATING THREE-DIMENSIONAL OBJECTS

RELATED APPLICATIONS

This application claims the benefit of PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Figure 2:
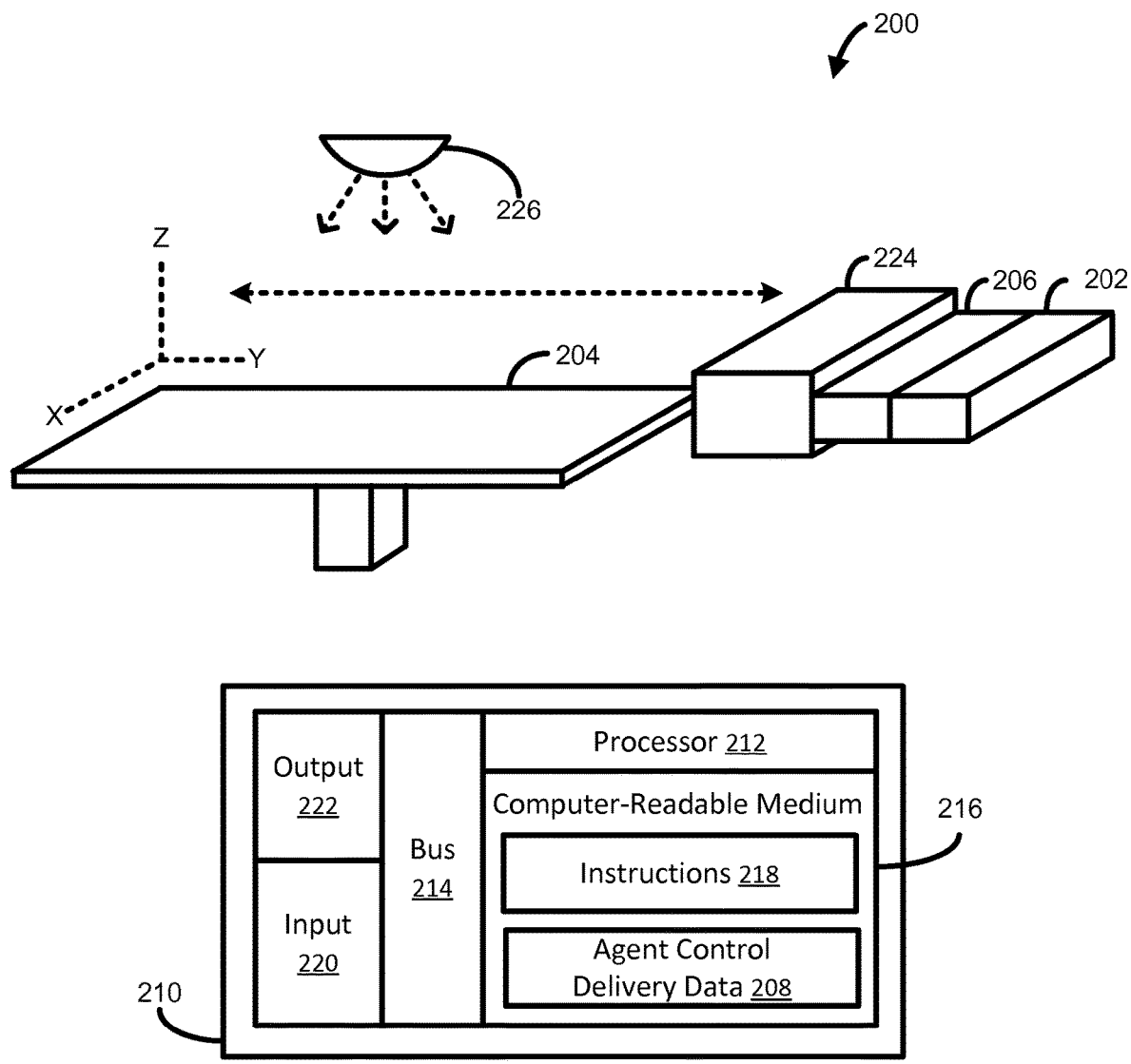

Some examples are described with respect to the following figures:

FIGS. 1a-1b, 3, and 5 each are flow diagrams illustrating methods of generating three-dimensional objects according to some examples;

FIG. 2 is a simplified isometric illustration of an additive manufacturing system according to some examples; and FIGS. 4a-h and 6a-h show series of cross-sectional side views of layers of build material according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Using an additive manufacturing system, a three-dimensional object may be generated through the solidification of portions of one or more successive layers of build material. The build material can, for example, be powder-based and the properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In other examples, other methods of solidification may be used.

Object properties may depend on the nature of the build materials used, the processes by which build material is solidified to form a desired three-dimensional object, and temperatures of build materials during such processes. Such properties may include, for example, surface roughness, accuracy, strength, and inter-layer bonding.

In some examples, energy absorbed by build material on which coalescing agent has been delivered or has penetrated may also propagate into surrounding build material. The energy may be sufficient to cause surrounding build material to heat up. For example, the energy may propagate laterally through the build material, beneath the current layer, and/or into a future layer. In some examples, this effect may be caused by materials having relatively high heat conductivity, and various values of melting enthalpy and heat capacity. In other examples, this effect may instead be exacerbated when using build materials having relatively low heat conductivity, as this may cause a heat reservoir to be formed beneath the surface of each newly created layer as it is formed. The heat in the reservoir may, in some circumstances, slowly propagate laterally across the build material, below the newest layer, and/or into a future layer once it is provided on the newest layer.

Thus, portions of the build material may be heated to a temperature suitable to cause softening and bonding of build material. This temperature could be above or below the material melting point. This may result in the subsequent solidification of portions of the build material that were not intended to be solidified and this effect is referred to herein as coalescence bleed. Coalescence bleed may result, for example, in a reduction in the overall accuracy of generated three-dimensional objects. For example, deformations may include three-dimensional portions such as a deformation extending laterally from the sides of the object, and a deformation extending below from the bottom of the object. Deformations may also include smaller irregularities in solidification due to undesired temperature distributions or heat conduction effects across the build material.

Additionally, in some examples, in an effect called "stair-stepping", layer-by-layer manufacturing may result in accurate and smooth object surfaces along x-y axis planes defined by each layer, but inaccurate and rough object surfaces along the z-axis, which is the axis that extends through multiple layers. The degree of inaccuracy may depend on the thickness of each layer of build material.

Accordingly, the present disclosure may allow three-dimensional objects to be created in which high quality object properties may be achieved. For example, the effects of coalescence bleed may be reduced, strong inter-layer bonding may be achieved, and stair-stepping effects between layers may be reduced. The following examples may achieve one or more of these effects.

Figure 1A:
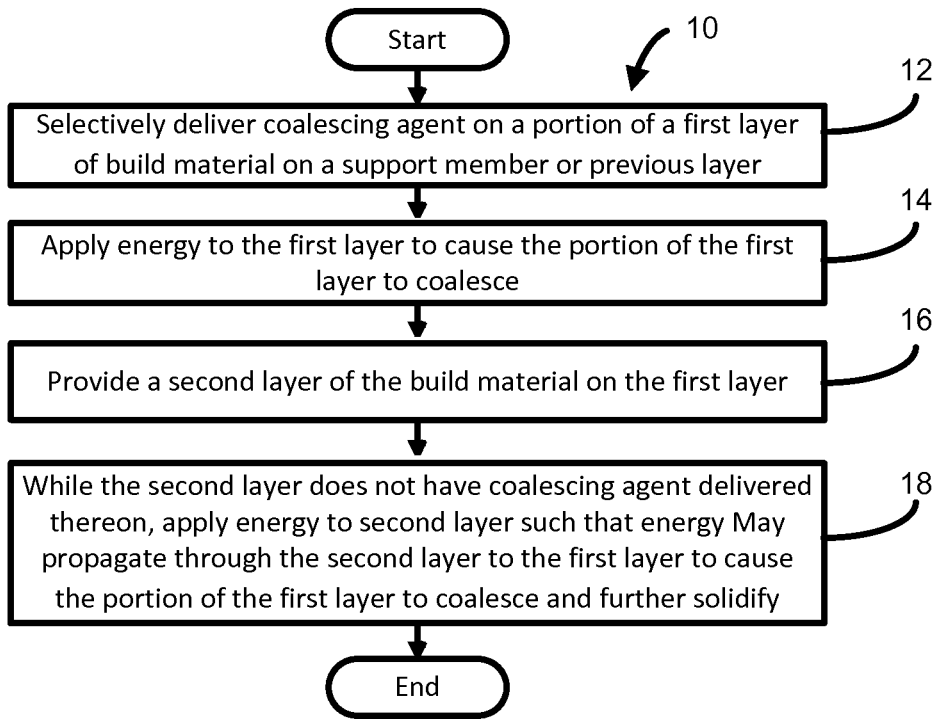

FIG. 1a is a flow diagram illustrating a method 10 of generating a three-dimensional object according to some examples. At 12, coalescing agent may be selectively delivered on a portion of a first layer of build material on a support member or previous layer. At 14, energy may be applied to the first layer to cause the portion of the first layer to coalesce and solidify. This may be a first coalescing stage. At 16, a second layer of the build material may be provided on the first layer. At 18, while the second layer does not have coalescing agent delivered thereon, energy may be applied to the second layer such that energy may propagate through the second layer to the first layer to cause the portion of the first layer to coalesce and further solidify. This may be a second coalescing stage.

In some examples, in the second coalescing stage, heat may propagate to the build material from all sides of the coalescing agent, because the coalescing agent may be surrounded by build material on all sides rather than only on lateral and bottom sides. This increased amount of volume in the build material available for heat propagation may allow the heat to propagate through the build material at shorter distances from the edge of the portion of the first layer on which coalescing agent was delivered. Thus, coalescence bleed resulting from heat propagation and mechanical stresses may be reduced.

In these examples, because risk of excessive heat propagation and thus coalescence bleed are reduced, various process parameters may be adjusted such that the coalescing agent exhibits higher and more efficient absorption of applied energy, as will be discussed.

In some examples, the two-step energy application may be used to achieve higher part density.

Thus, desired object properties may be achieved, such as strong inter-layer bonding, high accuracy, and desired surface characteristics and surface definition.

Figure 1B:
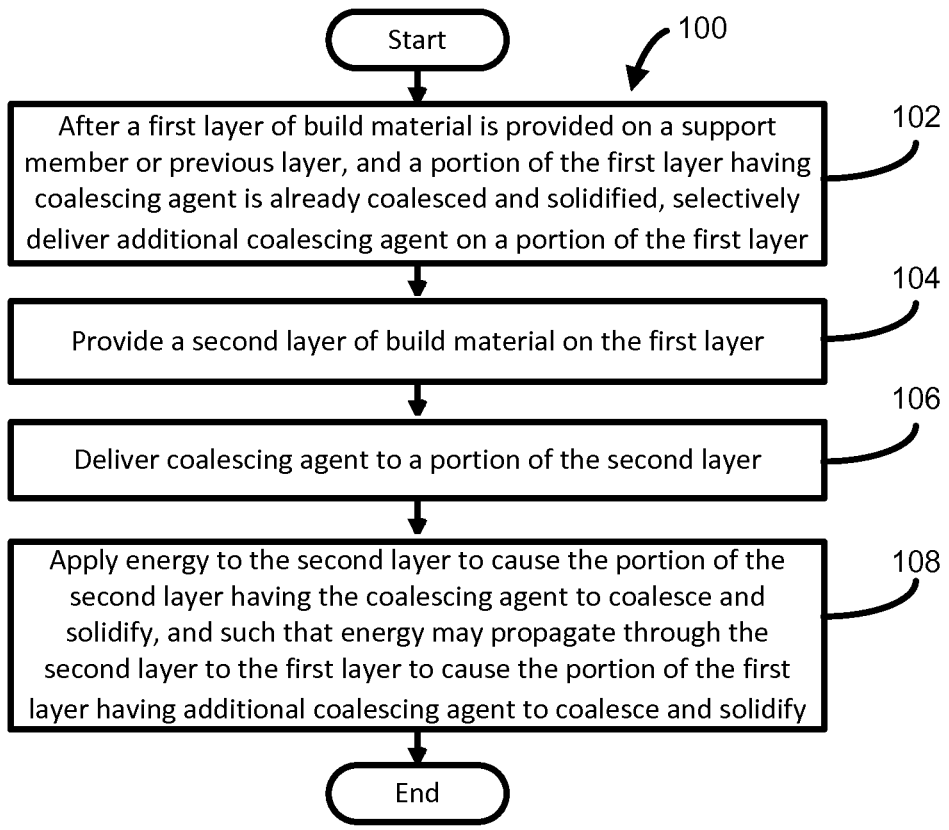

FIG. 1b is a flow diagram illustrating a method 100 of generating a three-dimensional object according to some examples. A first layer of build material may have been provided on a support member or previous layer, and a portion of the first layer having coalescing agent may have already coalesced and solidified. At 102, additional coalescing agent may be selectively delivered on a portion of the first layer. At 104, a second layer of the build material may be provided on the first layer. At 106, coalescing agent may be delivered to a portion of the second layer. At 108, energy may be applied to the second layer to cause the portion of the second layer having the coalescing agent to coalesce and solidify, and such that energy may propagate through the second layer to the first layer to cause the portion of the first layer having the additional coalescing agent to coalesce and solidify.

The method of FIG. 1B may, in some examples, achieve one or more of the results described above relative to FIG. 1A, including reduction of coalescence bleed, strong inter-layer bonding, high accuracy, and desired surface characteristics and surface definition. Additionally, in some examples, the method of FIG. 1B may also achieve reduction in stair-stepping. For example, by causing, in one stage, coalescence of both the portion of the first layer having the additional coalescing agent as well as the portion of the second layer having the coalescing agent, a smoother surface in the z-axis direction may be achieved along the first and second layers.

FIG. 2 is a simplified isometric illustration of an additive manufacturing system 200 according to some examples. The system 200 may be operated, as described further below with reference to the flow diagram of FIG. 3, to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composited materials, powder ceramic materials, powdered glass materials, powdered resin material, powdered polymer materials, and the like, and combinations thereof. It should be understood, however, that the examples described herein are not limited to powder-based materials or to any of the materials listed above. In other examples the build material may be a paste, liquid, or a gel. According to one example a suitable build material may be a powdered semi-crystalline thermoplastic material. In some examples, a suitable material may be a nylon having a heat conductivity of about 0.1 W/m K at room temperature and about 0.2 W/m K at melting point.

In some examples, the build material may be substantially transparent to the energy provided by the energy source 226, which will be discussed in further detail. For example, the build material may be substantially transparent to infra-red radiation. Thus, in the absence of coalescing agent, the build material may experience little heating or may not heat up when the energy passes through.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an absorber that absorbs the radiant spectrum of the energy emitted by an energy source 226. For example, the ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers may be dye based colored ink and pigment based colored ink, such as inks commercially known as CM993A and CE042A available from Hewlett-Packard Company.

In one example the support member 204 has dimensions in the range of from about 10 cm by 10 cm up to 100 cm by 100 cm. In other examples the support member 204 may have larger or smaller dimensions. The support member 204 may be a fixed part of the system 200, or may not be a fixed part of the system 200, instead being, for example, a part of a removable module.

The controller 210 controls the selective delivery of coalescing agent to a layer of provided build material in accordance with instructions comprising agent delivery control data 208.

The agent distributor 202 may be a printhead, such as thermal printhead or piezo inkjet printhead. The printhead may have arrays of nozzles. In one example, printheads such as those commonly used in commercially available inkjet printers may be used. In other examples, the agents may be delivered through spray nozzles rather than through printheads. Other delivery mechanisms may be used as well.

The agent distributor 202 may be used to selectively deliver, e.g. deposit, coalescing agent when in the form of a suitable fluid such as liquid. In some examples, the agent distributor 202 may be selected to selectively deliver drops of agent at a resolution of between 300 to 1200 dots per inch (DPI), for example 600 DPI. In other examples the agent distributor 202 may be selected to deliver drops of agent at a higher or lower resolution. In some examples, the agent distributor 202 may have an array of nozzles through which the agent distributor 202 is able to selectively eject drops of fluid. In some examples, each drop volume may be in the order of about 10 pico liters (pl) per drop, although in other examples the agent distributor 202 is able to deliver a higher or lower drop size. In some examples the agent distributor 202 is able to deliver variable size drops.

In some examples the coalescing agent may comprise a liquid carrier, such as water or any other suitable solvent or dispersant, to enable it to be delivered via a printhead.

In some examples the printhead may be a drop-on-demand printhead. In other examples the printhead may be a continuous drop printhead.

In some examples, the agent distributor 202 may be an integral part of the system 200. In some examples, the agent distributor 202 may be user replaceable, in which case they may be removably insertable into a suitable agent distributor receiver or interface module of the system 200.

In the example illustrated in FIG. 2, the agent distributor 202 may have a length that enables it to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributor 202 may have a shorter length that does not enable it to span the whole width of the support member 204.

The agent distributor 202 may be mounted on a moveable carriage to enable it to move bi-directionally across the length of the support member 204 along the illustrated y-axis. This enables selective delivery of coalescing agent across the whole width and length of the support member 204 in a single pass. In other examples the agent distributor 202 may be fixed, and the support member 204 may move relative to the agent distributor 202.

It should be noted that the term 'width' used herein is used to generally denote the shortest dimension in the plane parallel to the x and y axes illustrated in FIG. 2, whilst the term 'length' used herein is used to generally denote the longest dimension in this plane. However, it will be understood that in other examples the term 'width' may be interchangeable with the term 'length'. For example, in other examples the agent distributor 202 may have a length that enables them to span the whole length of the support member 204 whilst the moveable carriage may move bi-directionally across the width of the support member 204.

In another example the agent distributor 202 does not have a length that enables it to span the whole width of the support member but are additionally movable bi-directionally across the width of the support member 204 in the illustrated x-axis. This configuration enables selective delivery of coalescing agent across the whole width and length of the support 204 using multiple passes. Other configurations, however, such as a page-wide array configuration, may enable three-dimensional objects to be created faster.

The coalescing agent distributor 202 may include a supply of coalescing agent or may be connectable to a separate supply of coalescing agent.

The system 200 may further comprise a build material distributor 224 to provide, e.g. deliver or deposit, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module.

In some examples, the thickness of each layer delivered by the build material distributor 224 may have a value selected from the range of between about 50 to about 300 microns, or about 90 to about 110 microns, or about 250 microns, although in other examples thinner or thicker layers of build material may be provided. The thickness may be controlled by the controller 210, for example based on the agent delivery control data 208.

In some examples, there may be additional coalescing agent distributors, such as the agent distributor 206. In some examples, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 202. However, in some examples, different agent distributors may deliver different coalescing agents, for example.

In some examples, a coalescence modifier agent distributor may be provided to deliver coalescence modifier agent to the build material, as is discussed in PCT International Patent Application No. PCT/EP2014/050841, which is hereby incorporated by reference herein in its entirety, and to which the present application claims priority. A coalescence modifier agent serves to reduce the degree of coalescence of a portion of build material on which the coalescence modifier agent has been delivered or has penetrated. Thus, to further reduce or control coalescence bleed, coalescence modifier agent may be delivered around portions of the build material in which coalescing agent is delivered. Thus, coalescence modifier agent may be used in any of the methods described herein to further enhance object properties of the objects being generated.

In the example shown the support member 204 is moveable in the z-axis such that as new layers of build material are deposited a predetermined gap is maintained between the surface of the most recently deposited layer of build material and lower surface of the agent distributor 202. In other examples, however, the support member 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources. In other examples, the energy source 226 may be a digital light projector.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with agent delivery control data 208. For example, the controller 210 may control the energy source only to apply energy to portions of build material on which coalescing agent has been applied.

In some examples, the energy source 226, for example when it is a digital light projector, may selectively apply energy to the build material in a selective pattern, for example some portions of the build material may receive energy, but other parts may not receive energy.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; and ii) portions of the build material on which only coalescing agent has been delivered or has penetrated coalesce when energy is temporarily applied thereto do coalesce.

In some examples, the system 200 may additionally include a heater or pre-heater to emit heat to maintain build material deposited on the support member 204 within a predetermined temperature range. The heater may have an array of heating units. The heating units may each be any suitable heating unit, for example a heat lamp such as an infra-red lamp. The configuration may be optimized to provide a homogeneous heat distribution toward the area spanned by the build material. Each heating unit, or groups of heating units, may have an adjustable current or voltage supply to variably control the local energy density applied to the build material surface.

Figure 3:
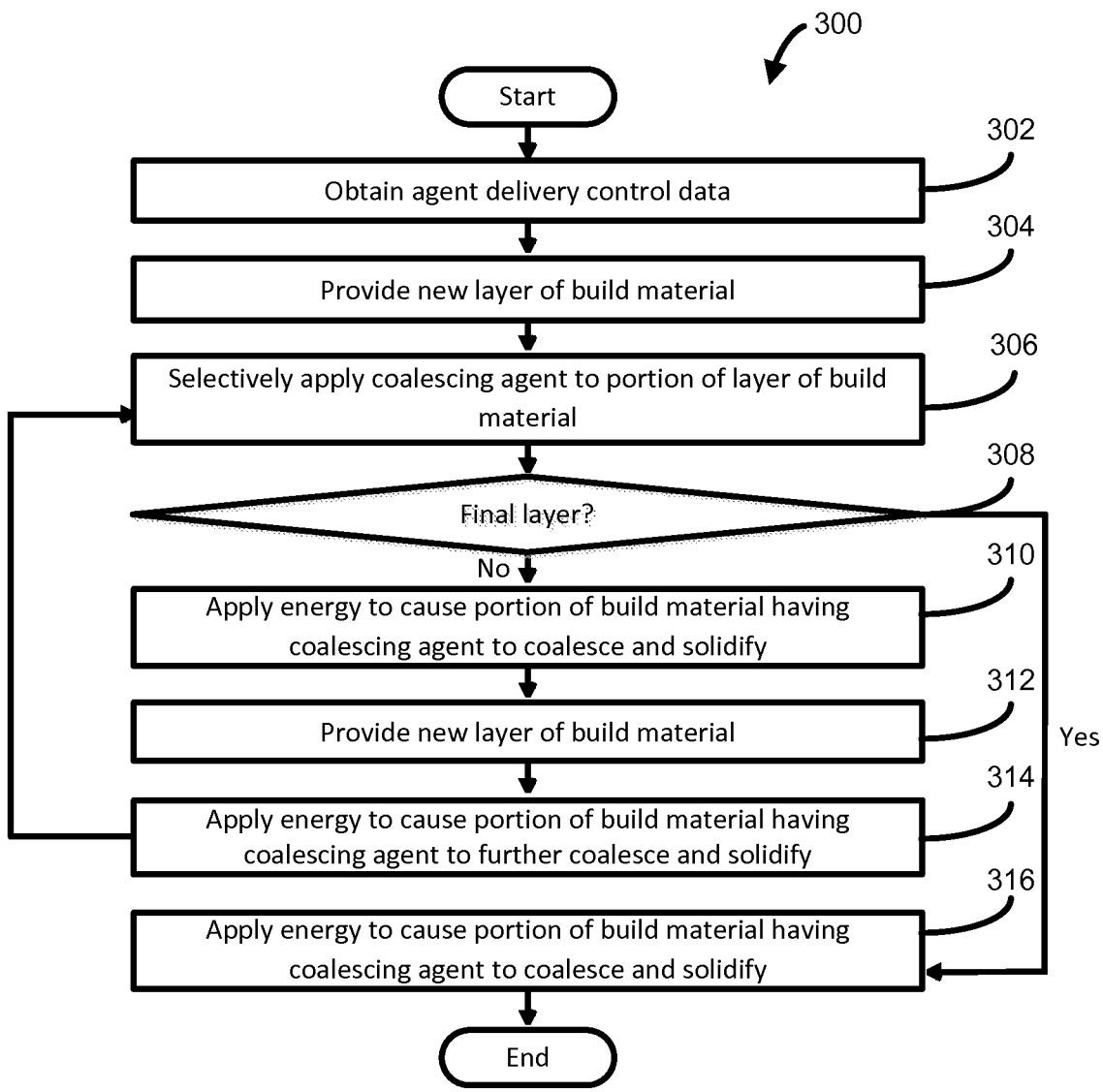

FIG. 3 is a flow diagram illustrating a method 300 of generating a three-dimensional object according to some examples. The method may be computer implemented. In some examples, the orderings shown may be varied, such that some steps may occur simultaneously, some steps may be added, and some steps may be omitted. In describing FIG. 3, reference will be made to FIGS. 2 and 4a-h. FIGS. 4a-h show a series of cross-sectional side views of layers of build material according to some examples.

At 302, the controller 210 may obtain agent delivery control data 208. The agent delivery control data 208 may define for each slice of the three-dimensional object to be generated the portions or the locations on the build material, if any, at which coalescing agent is to be delivered.

The agent delivery control data 208 may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 400. For example, the three-dimensional object processing system may be a software application, or part of a software application, executable on a computing device separate from the system 200.

In some examples, the agent delivery control data 208 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

In some examples the object processing system may obtain data relating to characteristics of the additive manufacturing system 200. Such characteristics may include, for example, build material layer thickness, properties of the coalescing agent, properties of the build material, and properties of the energy source 226, properties of the heater 230, and properties of the temperature sensor 228.

The agent delivery control data 208 may describe, for each layer of build material to be processed, locations or portions on the build material at which coalescing agent is to be delivered. In one example the locations or portions of the build material at which coalescing agent is to be delivered are defined by way of respective patterns.

Depending on the characteristics described above, the density at which coalescing agent is to be delivered may be varied. For example, when a portion of build material on which coalescing agent has been delivered or has penetrated receives applied energy, the energy absorbed by those portions propagates to other surrounding areas. In one example, the properties of the coalescing agent and the amount of coalescing agent delivered may be chosen such that energy propagates in a sphere in the range of about 1.5 times the layer thickness. This may help ensure not only sufficient inter-layer bonding, but also sufficient bonding between laterally adjacent portions of build material. The density may also be varied to regulate temperature of the build material, as will be discussed in reference to block 310.

In this way, the object processing system may, for example, determine that the lateral spacing between adjacent drops of coalescing agent may be increased whilst still ensuring sufficient object strength. Doing so reduces the average density at which coalescing agent may be delivered to a layer of build material, and hence reduces consumption of coalescing agent, but without affecting the object strength.

At 304, a layer 402a of build material may be provided. For example, the controller 210 may control the build material distributor 224 to provide the layer 402a on the support member 204 by causing the build material distributor 224 to move along the y-axis as discussed earlier.

Figure 4A:
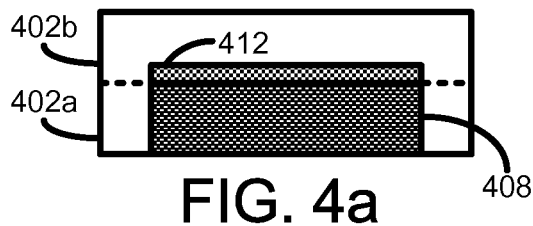
Figure 4E:
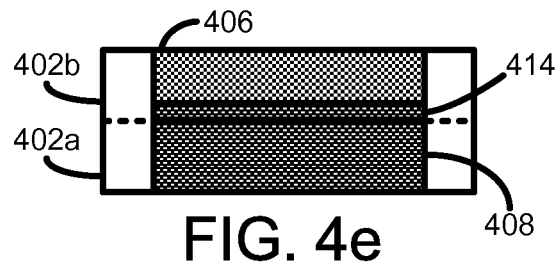

In FIG. 4a, the layer 402a is shown as completed, in that it may include a solidified portion 408, for illustrative purposes. It is understood that one iteration of steps 306 to 314 may initially be applied to generate the solidified portion 408 of the first layer 402a. This may include providing the second layer 402b in step 312, as is shown in FIG. 4a. This may also include causing a portion 412 of build material adjacent to the completed portion 408 to partially coalesce and solidify upon application of energy at 314, as shown in FIG. 4a, completely coalesce and solidify upon application of energy at 314. This effect may be a result of desired coalescence bleed in the z-axis direction, as will be discussed in more detail with reference generating a similar portion 412 in layer 402c at step 316, as shown in FIG. 4h.

Steps 306 to 314 will now be described in more detail with reference to completing layer 402b and subsequent layers.

Figure 4B:
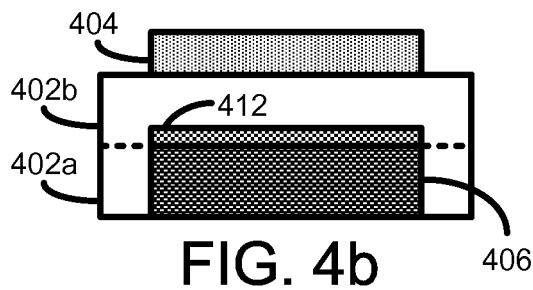
Figure 4F:
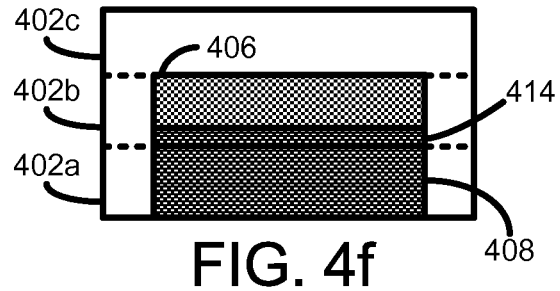

At 306, a coalescing agent 404 may be selectively delivered to one or more portions of the surface of the layer 402b of build material, as shown in FIG. 4b. As discussed earlier, the agent 404 may be delivered by agent distributor 202, for example in the form of fluids such as liquid droplets.

The selective delivery of the agent 404 may be performed in patterns on portions of the layer 402b that the agent delivery control data 208 may define to become solid to form part of the three-dimensional object being generated. "Selective delivery" means that coalescing agent may be delivered to selected portions of the surface layer of the build material in various patterns. The patterns may be defined by the agent delivery control data 208.

Figure 4C:
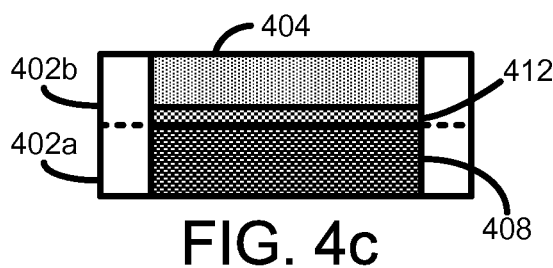

FIG. 4c shows coalescing agent 404 having penetrated substantially completely into the layer 402b of build material, but in other examples, the degree of penetration may be less than 100%. The degree of penetration may depend, for example, on the quantity of agent delivered, on the nature of the build material, on the nature of the agent, etc. The coalescing agent 404 may also have penetrated into the portion 412, which may be partially solidified.

At decision block 308, if the latest layer provided thus far is to be the final layer, then the method 300 may proceed to 316. If it is not to be the final layer, the method 300 may proceed to 310.

At 310, a predetermined level of energy may be temporarily applied to the layer 402b of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; characteristics of the coalescing agent; thickness of each build material layer; and other build process parameters. The type of energy source used may depend on one or more of: characteristics of the build material; and characteristics of the coalescing agent. In one example, the energy may be applied for a predetermined length of time.

The temporary application of energy may cause portions of the build material on which coalescing agent 404 has been delivered or has penetrated to heat up above the melting point of the build material and to coalesce. For example, the temperature of some or all of the layer 402b may achieve about 220 degrees Celsius. As shown in FIG. 4d, the applied energy may be absorbed by the portion having the coalescing agent 404. Then, the portion may release some energy to the surrounding build material, as depicted by the arrows in FIG. 4d, causing the portion to heat up. For example, the energy may propagate laterally through the layer 402b and/or beneath the layer 402b into the layer 402a.

Upon cooling, the portion 406 which has coalesced may become solid and form part of the three-dimensional object being generated, as shown in FIG. 4e. However, in some examples, the coalescence and solidification may be partial, as represented by portions 406, which are less solidified than the more fully solidified portion 408 of the layer 402a. For example, some non-solidified build material may remain in the portion 406. To achieve this, the amount of energy applied may be limited in duration and/or intensity such that coalescence and solidification may be partial. By limiting the amount of energy applied in this step, coalescence bleed may be reduced and/or eliminated. Completion of solidification may be performed at 314, as will be discussed. In other examples, sufficient energy may be applied to solidify all of the build material in portion 406, such that the additional step at 314 may result in stronger inter-layer bonding.

As discussed earlier, portion 408 may have been generated in a previous iteration of steps 306 to 314. The heat absorbed during the application of energy may propagate to the previously solidified portion 408 to cause part of portion 408 to heat up above its melting point. This effect may cause inter-layer bonding between portions 406 and 408 of FIG. 4e. Additionally, the portion 412 of FIG. 4d may, in some examples, coalesce and further solidify to become portion 414, as shown in FIG. 4e. This portion 414 may serve as a transition area of varying solidification between the layers 402a and 402b, and may aid in causing strong interlayer bonding between adjacent layers 402a and 402b. The full strength of interlayer bonding may be achieved at 314, as will be discussed.

At 312, a layer 402c of build material may be provided. For example, the controller 210 may control the build material distributor 224 to provide the layer 402c on the support member 204, particularly on the layer 402b, by causing the build material distributor 224 to move along the y-axis as discussed earlier. The layer 402c may be delivered similarly as previously deposited layers, as discussed at 304.

Figure 4G:
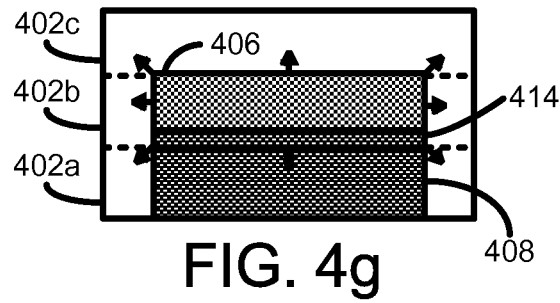
Figure 4D:
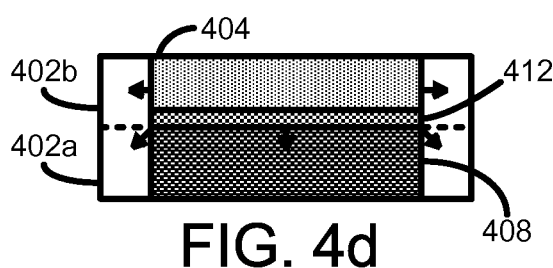
Figure 4H:
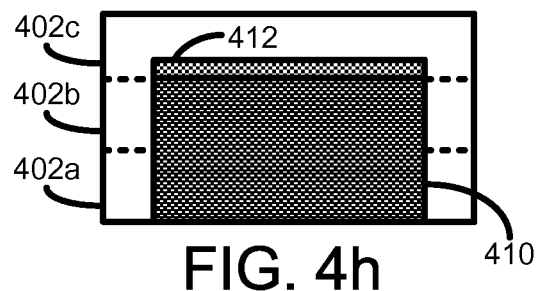

At 314, a predetermined level of energy may be temporarily applied to the layer 402c of build material, as shown in FIG. 4g. The energy applied and energy source may be similar to those described earlier, including at 310. In one example, the energy may be applied for a predetermined length of time.

The energy may be applied to the layer 402c while it does not have coalescing agent delivered thereon. The build material may be substantially transparent to the energy. Thus, the energy may propagate through the layer 402c to the layer 402b to cause the portions 406 and 414 to heat up above the melting point of the build material and to coalesce. For example, the temperature of some or all of the portions 406 and 414 may achieve about 220 degrees Celsius. Upon absorbing the energy, the portions 406 and 414 may release some energy to the surrounding build material, as depicted by the arrows in FIG. 4g, causing the portion to heat up. Because the portions 406 and 414 may be surrounded on all sides by build material, the energy may propagate laterally through the layer 402b, beneath the layer 402b into the layer 402a, and above the layer 402b into the layer 402c. Due to the increased build material volume available for propagation, the heat may propagate through the build material at shorter distances from the edge of the portion 406. Thus, coalescence bleed may be reduced and/or eliminated, for example in the lateral x-axis and y-axis directions, and in the upward z-direction.

Upon cooling, the portion 406 may have become more completely solid to form part of the three-dimensional object being generated, as shown in FIG. 4h. The heat absorbed during the application of energy may propagate to the previously solidified portion 408 of layer 402a to cause part of portion 408 of layer 402a to heat up above its melting point. This effect helps creates a completed portion 410 extending from layer 402a to 402b. Strong interlayer bonding between adjacent layers 402a and 402b of solidified build material may be achieved, as shown in FIG. 4h.

As discussed earlier, coalescence bleed may be reduced and/or eliminated in the lateral x-axis and y-axis directions. However, in some examples, if the portion in layer 402c directly above portion 410 in layers 402a and 402b is intended to be later solidified to form part of the object, then it may be desired to achieve some coalescence in the z-axis direction into the layer 402c. This may be achieved because the surface of the portion 410 facing the z-axis direction and defined by a plane along the x-axis and y-axis may have a greater area than the surface areas facing laterally in the x-axis and/or y-axis directions. Thus, a suitable amount of energy may be applied during 316 such that a portion 412 of build material adjacent to the completed portion 410 in the z-axis direction may at least partially or completely coalesce and solidify upon application of energy at 314. The energy may be suitably high to counteract the reduced overall coalescence bleed resulting from increased build material volume available for heat propagation. Thus, the layer 402b's coalescing agent, which may absorb energy, may then release heat into portion 412 of layer 402c, causing the at least partial coalescence and solidification of portion 412.

The creation of portion 412, combined with additional treatment of layers 402c in a subsequent iteration of the steps 306 to 314, may create strong interlayer bonding between adjacent layers 402b and 402c. The coalescence of portion 412 may not ultimately result in deformations, because the portion 412 may later be subsumed into a part of the object to be completed in layer 402c.

After layer 402b has been processed as described above, the method 300 may then proceed back to 306 such that a portion of layer 402c may be solidified. Steps 306 to 314 may be repeated to process new layers of build material to generate a three-dimensional object layer-by-layer.

At 316, a predetermined level of energy may be temporarily applied to the final layer, which may have had coalescing agent 404 delivered thereon at 306. The energy applied and energy source may be similar to those described earlier. The energy may be applied for a predetermined length of time. The energy may be absorbed by the portion having coalescing agent 404 such that the portion may coalesce and solidify, and bond to the previous layer. The final layer may be subject to a single energy application stage rather than two, because no further layer may be provided on top of the final layer.

The method 300 may thus achieve reduced coalescence bleed, high energy efficiency, enhanced solidification, strong inter-layer bonding, and high part density as a result of two-step energy application, resulting in desired object properties, similar to as discussed earlier relative to method 10.

As discussed, the method 300 may provide high energy efficiency in the solidification process. For example, because risk of excessive heat propagation and thus coalescence bleed are reduced, various process parameters may be adjusted such that the coalescing agent exhibits higher and more efficient absorption of applied energy. This may enhance solidification of build material where coalescing agent is delivered. Such process parameters may include selecting the coalescing agent and its absorption band, as well as the energy spectrum e.g. radiation spectrum of the energy source, to achieve high energy absorption. Process parameters may also include, to control energy absorption, enhancing the reflectivity of the build material in the energy spectrum e.g. radiation spectrum used by the energy source. Process parameters may also include providing energy e.g. radiation that has longer or substantially longer wavelengths than the thickness of each layer to achieve low scattering. The low scattering may allow the energy to pass through a layer, e.g. at step 314, such that it may reach a portion of a previous layer on which coalescing agent has been deposited. Thus, the energy may be absorbed to increase the ratio of energy absorbed by the coalescing agent relative to the build material.

Figure 5:
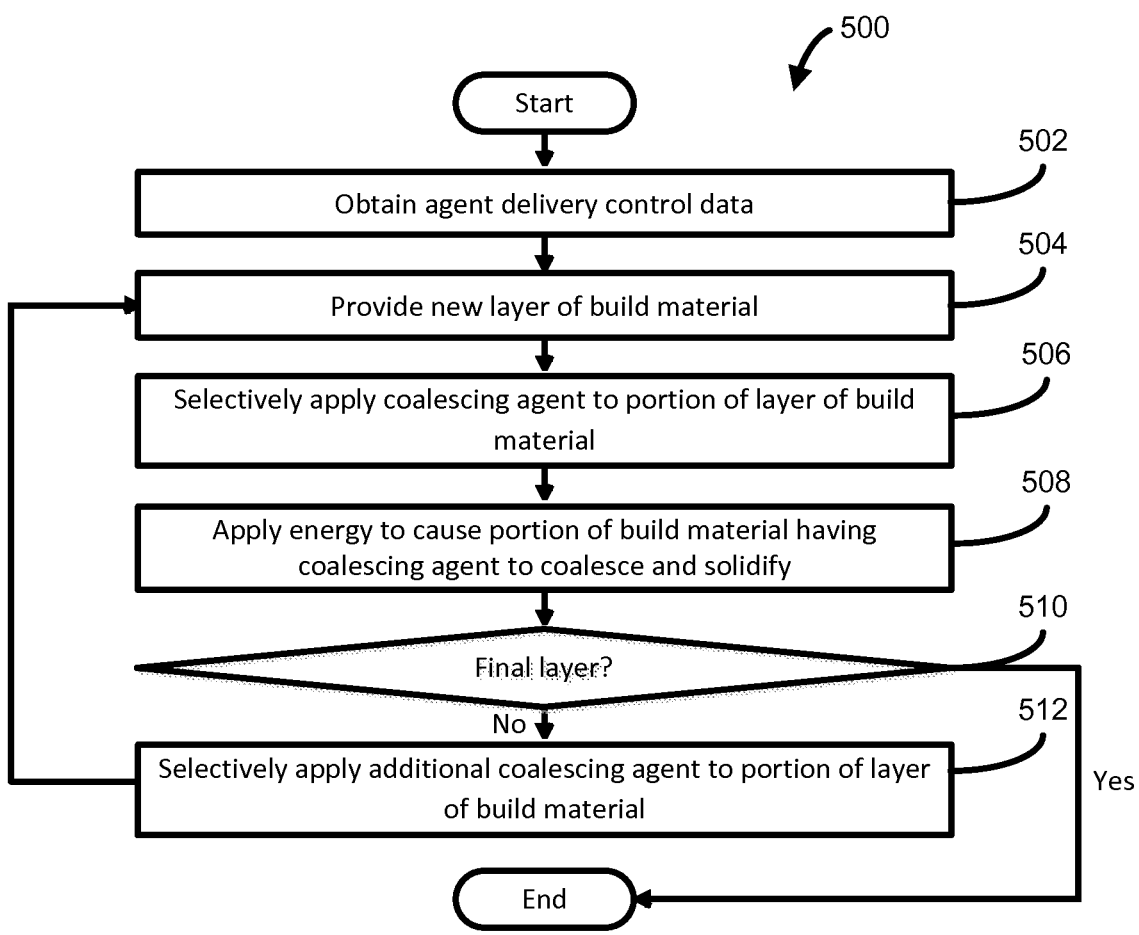

FIG. 5 is a flow diagram illustrating a method 500 of generating a three-dimensional object according to some examples. The method may be computer implemented. In some examples, the orderings shown may be varied, such that some steps may occur simultaneously, some steps may be added, and some steps may be omitted. In describing FIG. 5, reference will be made to FIGS. 2 and 6a-h. FIGS. 6a-h show a series of cross-sectional side views of layers of build material according to some examples.

At 502, the controller 210 may obtain agent delivery control data 208, in a similar way as described earlier with respect to 302 of FIG. 3.

At 504, a layer 602a of build material may be provided. For example, the controller 210 may control the build material distributor 224 to provide the layer 602a on the support member 204 by causing the build material distributor 224 to move along the y-axis as discussed earlier.

At 506, a coalescing agent 604 may be selectively delivered to one or more portions of the surface of the layer 602a of build material. As discussed earlier, the agent 604 may be delivered by agent distributor 202, for example in the form of fluids such as liquid droplets.

The selective delivery of the agent 604 may be performed in patterns on portions of the layer 602a that the agent delivery control data 208 may define to become solid to form part of the three-dimensional object being generated. The patterns may be defined by the agent delivery control data 208.

The coalescing agent 604 may penetrate substantially completely into the layer 602a of build material, but in other examples, the degree of penetration may be less than 100%. The degree of penetration may depend, for example, on the quantity of agent delivered, on the nature of the build material, on the nature of the agent, etc.

At 508, a predetermined level of energy may be temporarily applied to the layer 602a of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; and characteristics of the coalescing agent. The type of energy source used may depend on one or more of: characteristics of the build material; and characteristics of the coalescing agent. In one example, the energy may be applied for a predetermined length of time.

Figure 6A:
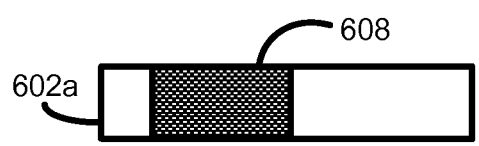

The temporary application of energy may cause portions of the build material on which coalescing agent 604 has been delivered or has penetrated to heat up above the melting point of the build material and to coalesce. For example, the temperature of some or all of the layer 602a may achieve about 220 degrees Celsius. The applied energy may be absorbed by the portion having the coalescing agent 604. Upon cooling, the portion 608 which has coalesced may become solid and form part of the three-dimensional object being generated, as shown in FIG. 6a.

At decision block 510, if the latest layer provided thus far is to be the final layer, then the method 500 may end. If it is not to be the final layer, the method 500 may proceed back to 504.

Figure 6E:
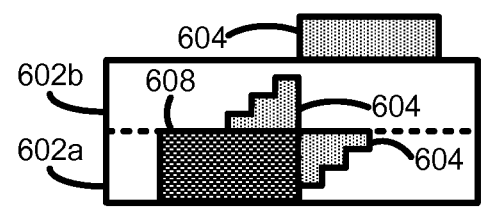
Figure 6B:

At 512, additional coalescing agent 604 may be selectively delivered to one or more portions of the surface of the layer 602a of build material, as shown in FIG. 6b. As discussed earlier, the agent 604 may be delivered by agent distributor 202, for example in the form of fluids such as liquid droplets.

The selective delivery of the additional agent 604 may be performed in patterns on portions of the build material that the agent delivery control data 208 may define to become solid to form part of the three-dimensional object being generated. The patterns may be defined by the agent delivery control data 208.

In FIG. 6b, a pattern is shown where an increasing amount of coalescing agent 604 is delivered on the center of the layer 602a compared to areas away of the center. For example, an increasing density of droplets may be delivered at the center compared to areas away from the center. This pattern may, for example, may allow for creating a smooth inter-layer transition between layers 602a-b, as will be discussed relative to FIG. 6h.

In the example of FIG. 6b, some of the additional coalescing agent 604 is delivered above the solidified portion 608, and some of the additional coalescing agent 604 is delivered above a non-solidified portion of the layer 602a. The part of the coalescing agent 604 delivered on the solidified portion 608 may not penetrate the layer 602a, as shown in FIG. 6c. However, the part of the coalescing agent 604 delivered on the non-solidified portion of layer 602a may penetrate into the layer 602a. As shown in FIG. 6c, the additional coalescing agent 604 may partially penetrate the layer 602a. In other examples, the degree of penetration may be less or greater than the amount shown in FIG. 6c. The degree of penetration may depend, for example, on the quantity and/or density of agent delivered, on the nature of the build material, on the nature of the agent, etc.

The method 500 may proceed from 512 back to 504.

At 504, a layer 602b of build material may be provided. For example, the controller 210 may control the build material distributor 224 to provide the layer 602b on the support member 204, particularly on the layer 602a, by causing the build material distributor 224 to move along the y-axis as discussed earlier.

The part of the coalescing agent 604 delivered on the solidified portion 608 may penetrate into the new layer 602b. As shown in FIG. 6b, this portion of the additional coalescing agent 604 may partially penetrate the layer 602b. In other examples, the degree of penetration may be less or greater than the amount shown in FIG. 6c. The degree of penetration may depend, for example, on the quantity and/or density of agent delivered, on the nature of the build material, on the nature of the agent, etc.

At 506, coalescing agent 604 may be selectively delivered to one or more portions of the surface of the layer 602b of build material, as shown in FIG. 6e. As discussed earlier, the agent 604 may be delivered by agent distributor 202, for example in the form of fluids such as liquid droplets.

The selective delivery of the agent 604 may be performed in patterns on portions of the layer 602b that the agent delivery control data 208 may define to become solid to form part of the three-dimensional object being generated. The patterns may be defined by the agent delivery control data 208.

Figure 6F:
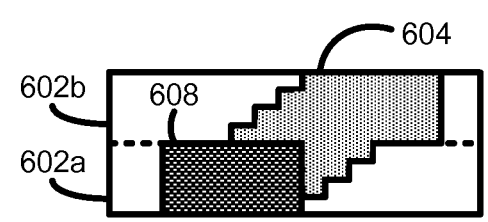
Figure 6C:

As shown in FIG. 6f, the coalescing agent 604 may penetrate substantially completely into the layer 602b of build material, but in other examples, the degree of penetration may be less than 100%. The degree of penetration may depend, for example, on the quantity of agent delivered, on the nature of the build material, on the nature of the agent, etc.

In FIG. 6f, the newly delivered coalescing agent 604, after penetrating the layer 602b, may be adjacent to the additional coalescing agent 604 previously delivered at 512, and to the solidified portion 608. As shown, the additional coalescing agent 604 previously delivered at 512 may surround the point at which the new coalescing agent 604 delivered at 506 meets the solidified portion 608. This configuration may, upon application of energy, cause the object to exhibit a smooth inter-layer transition in the z-axis direction, as will be discussed.

Figure 6G:
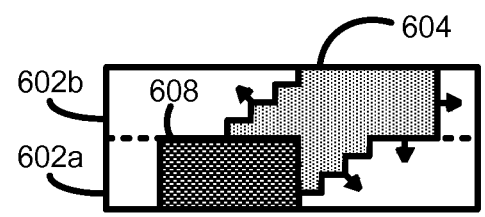
Figure 6D:

At 508, a predetermined level of energy may be temporarily applied to the layer 602b of build material, as shown in FIG. 6g. The energy applied and energy source may be similar to those described earlier. In one example, the energy may be applied for a predetermined length of time.

The build material may be substantially transparent to the energy. Thus, the energy may propagate through the layer 602b and to the layer 602a, such that all of the portions having coalescing agent 604 to heat up above the melting point of the build material and to coalesce. For example, the temperature of some or all of the portions having coalescing agent 604 may achieve about 220 degrees Celsius. Upon absorbing the energy, the portions having coalescing agent 604 may release some energy to the surrounding build material, as depicted by the arrows in FIG. 6g, causing the portion to heat up. Most of the portions having coalescing agent 604, as shown in FIG. 6g, may be surrounded by build material, but in other examples, all of the portions may be surrounded by build material. Thus, the energy may propagate laterally, upward, or downward through the layers 602a and 602b. Because of the high build material volume available for propagation, the heat may propagate through the build material at shorter distances from the edge of the portion 406. Thus, coalescence bleed may be reduced and/or eliminated.

Figure 6H:
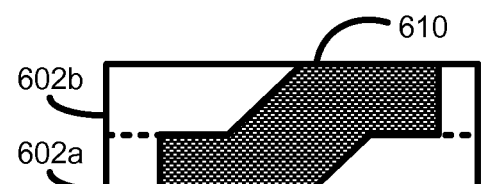

Upon cooling, the portions having coalescing agent 604 may have coalesced and therefore become solid to form part of the three-dimensional object being generated, as shown in FIG. 6h. The heat absorbed during the application of energy may propagate to the previously solidified portion 608 of layer 602a to cause part of portion 608 of layer 602a to heat up above its melting point. This effect helps creates a completed portion 610 extending from layer 602a to 602b. Strong interlayer bonding between adjacent layers of solidified build material may be achieved, as shown in FIG. 4h. Moreover, by including the coalescing agents 604 delivered at 512 around the junction between the new coalescing agent 604 delivered at 506 and the solidified portion 608 of FIG. 6g, the coalescence and solidification may occur in such a way that a smooth inter-layer transition is created in the z-axis direction.

Iteration of steps 504 to 512 may be repeated to process new layers of build material to generate a three-dimensional object layer-by-layer.

The method 500 may thus achieve reduced coalescence bleed, high energy efficiency, enhanced solidification, strong inter-layer bonding, and reduced and/or eliminated stair-stepping, similar to as discussed earlier relative to method 100.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An apparatus for generating a three-dimensional object, the apparatus comprising:
   a build material distributor to provide layers of build material;
   an agent distributor to selectively deliver a liquid, light absorbing coalescing agent on layered build material;
   a light source to apply light energy to layered build material; and
   a controller configured to:
   control the agent distributor to selectively deliver the coalescing agent on a portion of a first layer of build material on a support member or previous layer;
   in a first coalescing stage for the first layer, control the light source to apply light energy to the first layer to generate heat to melt the portion of the first layer where the coalescing agent was delivered;
   control the build material distributor to provide a second layer of the build material on the first layer; and
   in a second coalescing stage for the first layer, before delivering the coalescing agent on the second layer, control the light source to apply light energy to the first layer through the second layer to re-melt a portion of the first layer where the coalescing agent was delivered.

2. The apparatus of claim 1 wherein the light source is a source of unfocused light to apply unfocused light to the build material.

3. The apparatus of claim 2 wherein the build material is substantially transparent to the light.

4. The apparatus of claim 3 wherein the build material includes Nylon 12 and the light source includes an infrared light source.

5. The apparatus of claim 1 wherein the controller is further configured to:
   control the agent distributor to selectively deliver the coalescing agent on a portion of the second layer of build material;
   in a first coalescing stage for the second layer, control the light source to apply light energy to the second layer to generate heat to melt the portion of the second layer where the coalescing agent was delivered;
   control the build material distributor to provide a third layer of the build material on the second layer; and
   in a second coalescing stage for the second layer, before delivering coalescing agent on the third layer, control the light source to apply light energy to the second layer through the third layer to re-melt a portion of the second layer where the coalescing agent was delivered.

6. The apparatus of claim 1 wherein the controller is to control the agent distributor to selectively deliver the coalescing agent in accordance with control data derived from a combination of data representing a slice of the three-dimensional object to be generated and data representing at least one desired object property of at least one portion of the three-dimensional object to be generated.

7. A method of generating a three-dimensional object, the method comprising:
   delivering a first layer of build material;
   selectively depositing a liquid, light absorbing coalescing agent to a portion of the first layer;
   in a first coalescing stage for the first layer, applying light energy to the first layer to generate heat to melt the portion of the first layer where the coalescing agent was deposited;

delivering a second layer of build material onto the first layer; and in a second coalescing stage for the first layer, before depositing the coalescing agent on the second layer, applying light energy to the first layer through the second layer to re-melt a portion of the first layer where the coalescing agent was deposited.

8. A computer readable medium having computer executable instructions thereon to perform a method of generating a three-dimensional object, the method comprising:

delivering a first layer of build material;

selectively depositing a liquid, light absorbing coalescing agent to a portion of the first layer;

in a first coalescing stage for the first layer, applying light energy to the first layer to generate heat to melt the portion of the first layer having the coalescing agent;

delivering a second layer of build material onto the first layer; and in a second coalescing stage for the first layer, applying light energy to the first layer through the second layer to re-melt a portion having the coalescing agent before depositing the coalescing agent on to any portion of the second layer.

9. The computer readable medium of claim 8 wherein the method comprises:

after applying light energy to the first layer through the second layer, selectively depositing the coalescing agent to a portion of the second layer; and then applying light energy to the second layer to generate heat to melt the portion of the second layer having the coalescing agent.

10. The computer readable medium of claim 8 residing on a controller for an additive manufacturing system.

* * * * *